US005528717A

United States Patent [19]

Schwering et al.

[11] Patent Number: 5,528,717

[45] Date of Patent: Jun. 18, 1996

[54] HYBRID DIELECTRIC SLAB BEAM WAVEGUIDE

[75] Inventors: Felix Schwering, Eatontown, N.J.; James W. Mink, Raleigh, N.C.

[73] Assignee: The United States of America as represented by the Secretary of the Army, Washington, D.C.

[21] Appl. No.: 258,147

[22] Filed: Jun. 10, 1994

[51] Int. Cl.[6] .......... G02B 6/00

[52] U.S. Cl. .......... 385/129

[58] Field of Search .......... 385/129, 130, 385/131, 132, 14, 123, 146, 140; 372/6, 62, 66

[56] References Cited

U.S. PATENT DOCUMENTS

| | | | |
|---|---|---|---|
| 4,507,787 | 3/1985 | Daly et al. | 372/66 |
| 4,509,175 | 4/1985 | Daly et al. | 372/62 |

OTHER PUBLICATIONS

Y. C. Shih et al, "Transmission Lines and Waveguides", Antenna Handbook by Y. T. Lo et al, Editors, Van Nostrand Reinhold, 1988, chap. 28.

P. Bhartia et al, "Millimeter Wave Engineering Applications", chap. 6, Wiley and Sons, New York, 1984.

Felix Schwering et al, "A Hybrid Dielectric Slab–Bema Waveguide for the Sub–Millimeter Wave Region", IEEE Transactions on Microwave Theory and Techniques, vol. 41, No. 10, Oct. 1993.

*Primary Examiner*—John Ngo

*Attorney, Agent, or Firm*—Michael Zelenka; William H. Anderson

[57] ABSTRACT

A slab dielectric waveguide for the millimeter and sub-millimeter wave regions is achieved by providing a thin grounded dielectric slab of rectangular cross-section into which a sequence of equally spaced cylindrical lenses are fabricated. The axis of these lenses coincides with the center line of the slab guide, i.e. the propagation direction of the guide. The spacing of the lenses S is assumed to be on the order of many guide wavelengths λ; the width of the slabguide w is on the order of at least several λ; and the thickness d of the guide typically is sufficiently small so that only the fundamental surface wave mode can exist on the slab. If the permittivity of the lenses exceeds that of the guide, the lenses will have a convex shape and in the opposite case, the lenses will have a concave shape. As those skilled in the art will appreciate, the concave shape will simplify the fabrication of guide and will reduce its diffraction losses.

21 Claims, 7 Drawing Sheets

HYBRID DIELECTRIC SLAB BEAM WAVEGUIDE

GOVERNMENT INTEREST

The present invention may be manufactured, used, sold and/or licensed by, or on behalf of, the Government of the United States of America without payment to us of any royalties thereon.

FIELD OF THE INVENTION

The present invention relates in general to the field of planar millimeter waveguides which are suited as a transmission medium for planar quasi-optical integrated circuits and devices operating in the millimeter and submillimeter wave regions.

BACKGROUND OF THE INVENTION

Heretofore several different types of planar guiding structures have been suggested/investigated for the microwave and millimeter wave regions. These guides have varied in structure and operating principal, but each of these designs has a common feature that their critical dimensions are on the order of one half the guide wavelengths, $\lambda_\epsilon/2$, or smaller. For the microwave and lower millimeter wave regions, this is, of course, advantageous because the guides have reasonable cross section dimensions, are easily fabricated by etching techniques and are well suited for the design of integrated circuits. A review of these guides may be found in such publications as: *Antenna Handbook*, by Y. T. Lo and S. W. Lee, Editors, Van Nostrand Reinhold, 1988, in particular, chapter 28 entitled, "Transmission Lines and Waveguides," by Y. C. Shih and T. Itoh; and *Millimeter Wave Engineering and Applications*, by P. Bhartia and I. J. Bahl, Wiley and Sons, New York, 1984, chapter 6.

In the upper millimeter and submillimeter wave regions, however, the guide dimensions become exceedingly small and the associated fight fabrication tolerances make these guides difficult and expensive to fabricate. This is because the guidance principle employed in dielectric guides is based upon the total reflection at the dielectric surface, which confines the transmitted energy to the interior of the guides. Typically, the width of these guides is chosen to be somewhat less than a half wavelength to avoid over-moding. Therefore, these small wavelengths in the upper millimeter and the submillimeter wave regions cause the guide width to become extremely narrow. This occurs especially when high-$\epsilon$ materials are used and therefore, these guides are very difficult to fabricate.

This problem is addressed by the present invention.

SUMMARY OF THE INVENTION

Accordingly, one object of the present invention is to provide for a dielectric slab-beam waveguide which is useful in the upper and sub millimeter wave regions and which is relatively easy to fabricate.

Another object of the present invention is to provide such a waveguide wherein the field distribution in TE and TM modes is virtually independent of the guide width.

These and other objects of the present invention are accomplished by using a quasi-optical guidance principle to provide beam confinement in the lateral direction. In essence, the waveguide according to the present invention "periodically refocuses" the signal propagating along the waveguide and thus keeps the signal modes in phase. This permits one to make the width of the guide electrically large. Therefore, this guide will propagate a spectrum of modes while still insuring that the field distribution of the modes will be independent of the guide width. Accordingly, even if there is a deviation in the physical width of the guide, a given single mode of the signal will suffer little degradation due to the mode conversion. Hence, there is no need for maintaining a constant width at tight tolerances when fabricating the device. In addition, bends and transitions are easily implemented in this guide in standard quasi-optical technology while causing minimum radiation loss and mode conversion. Further, the guide sections operated as open resonators should be well suited for the design of quasi-optical power combiners that could serve as single mode power sources for these guides.

Specifically, these advantages are accomplished by providing a thin grounded dielectric slab of rectangular cross-section into which a sequence of equally spaced cylindrical lenses are fabricated. The axis of these lenses coincides with the center line of the slab guide, i.e. the propagation direction of the guide. The spacing of the lenses S is assumed to be on the order of many guide wavelengths $\lambda$; the width of the slabguide w is on the order of at least several $\lambda$; and the thickness d of the guide typically is sufficiently small so that only the fundamental surface wave mode can exist on the slab. If the permittivity of the lenses exceeds that of the guide, the lenses will have a convex shape and in the opposite case, the lenses will have a concave shape. As those skilled in the art will appreciate, the concave shape will simplify fabricating the guide and will reduce its diffraction losses.

The structure uses two distinct waveguiding principles in conjunction with each other to confine and guide electromagnetic waves. Referring to FIG. 1, the field distribution of a guided wave is that of a surface-wave mode of the slabguide in the x-direction. The wave is guided by total reflection at the dielectric-to-air interface and its energy is transmitted primarily within the dielectric. In the y-direction, the field distribution is that of a Gaussian beam-mode which is guided by the lenses through periodic reconstitution of the cross-sectional phase distribution, resulting in an "iterative wavebeam" whose period is the spacing of the lenses. Therefore, the guided modes are, in effect, TE- or TM-polarized with respect to the z-direction, the propagation of the guide.

The waveguide will be useful in particular for the sub-mm region of the electromagnetic spectrum. It bridges the gap between conventional dielectric waveguides employed in the mm wave region and slab type dielectric waveguides used at optical wavelengths. Combining structural simplicity, approaching that of a slab guide, with the increased lateral dimensions of quasi-optical devices, it should be easy to fabricate and show good electrical performance. The present invention, therefore, is well suited in particular as basic transmission medium for the design of planar integrated circuits and components.

BRIEF DESCRIPTION OF THE DRAWINGS

These objectives and other features of the invention will be better understood in light of the ensuing Detailed Description of the Invention and the attached drawings wherein:

FIGS. 1*a* and 1*b* are perspective views of the preferred embodiment of the present invention wherein FIG. 1*a* represents lenses of a convex shape embedded in a slab-beam waveguide and wherein FIG. 1*b* represents lenses of a concave shape embedded in a slab-beam waveguide according to the present invention;

DETAILED DESCRIPTION OF THE INVENTION

Figure 2:
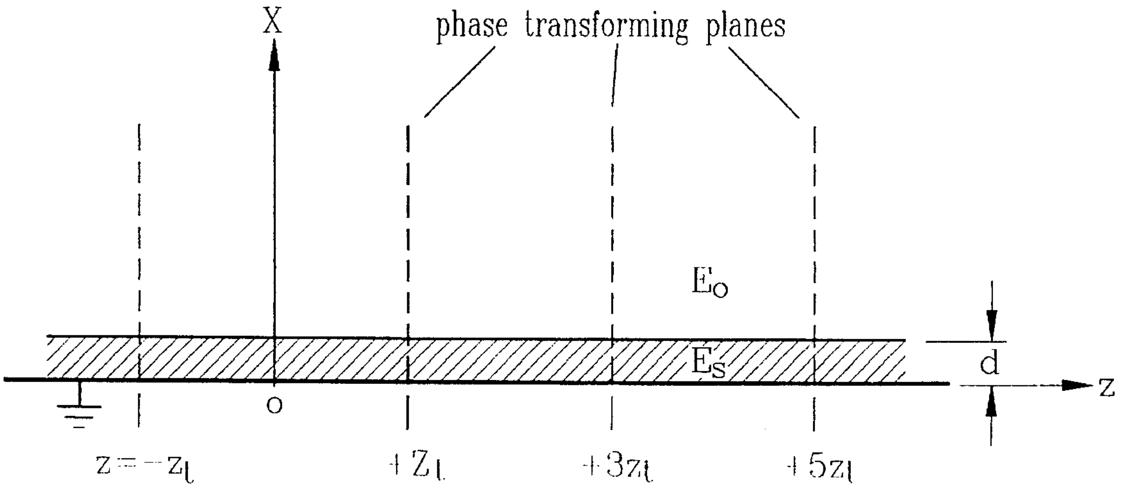
FIG. 2 is a cross-sectional view of an idealized dielectric slab-beam waveguide with planar, infinitely thin phase transformers wherein the slab is assumed to be unbounded in the y-direction, and the phase transformers extend to infinity in both the x- and y-directions.

In order to fully understand the concepts of the present invention, an idealized dielectric slab-beam waveguide, which is shown in FIG. 2, will be considered. This idealized slab-beam waveguide consists of a grounded dielectric slab having a permittivity of $E_s$, which extends in the y-direction to infinity. In the planes $z=(2\mu-1)z_t$, with $\mu=0, 1, 2, \ldots,$ planar phase transformers are inserted in the guide. The phase transformers also extend into infinity, both in the x- and y-directions, and as will be shown in the following discussion, introduce a phase shift in the transmitted fields that is quadratic in y and uniform in the x.

For purposes of this discussion, the field is assumed to be formulated in the space region $-z_t<z<+z_t$. Since the guide structure in this region is uniform in the y and z, but layered in the x, it is convenient to write this field as a superposition of an E-field with $H_x\equiv 0$ and an H-field with $E_x\equiv 0$. The E-field and H-field are derived, respectively, from an x-directed electric and magnetic vector potential. Generally, these potentials are written as superpositions of elementary waves defined by the modes of the grounded dielectric slab guide. Further, it is well known that the spectrum of slab guide modes consists of two parts, a discrete spectrum of surface wave modes guided by the slab and a continuous spectrum of radiative modes (quasimodes) describing radiation effects. Taken together, these two spectra form a complete orthogonal system into which any field, whose distribution in a plane z=const., can be expanded. In the present context, the fields of interest are purely bound and do not radiate. Hence, in any guide section between adjacent phase transformers, these fields can be represented solely in terms of the surface wave modes and the spectrum of radiative modes can be disregarded.

In the two-dimensional case, where all field components are independent of the y-coordinate, the slabguide modes are well known. E-type fields in this case reduce to TM-waves with the components $E_x$, $E_z$, $H_y$ and H-type fields to TE-waves with the components $E_y$, $H_x$, $H_z$. The derivation of the respective potentials and the propagation modes in this present context are given in an article entitled, "A Hybrid Dielectric Slab-Beam Waveguide for the Sub-Millimeter Wave Region," IEEE Transactions on *Microwave Theory and Techniques*, Vol. 41, No. 10, October 1993, and authored by the inventors listed herein; this article is incorporated herein by reference hereto.

In order to solve the respective potentials and the propagation modes, the propagation constants must be known and are determined by the following characteristic equations:

$$\sqrt{k_s^2-\beta_n^2}\,\tan[(\sqrt{k_s^2-\beta_n^2})]d=\left(\frac{k_s}{k_o}\right)^2\sqrt{\beta_n^2-k_o^2}$$

for TM polarization ($\Psi_n$) and $$\sqrt{\bar{\beta}_s^2-k_o^2}\,\tan\left[\left(\sqrt{k_s^2-\bar{\beta}_n^2}\right)\right]d=-\sqrt{k_s^2-\bar{\beta}_n^2}$$

for TE polarization ($\Phi_n$). In these equations, references to $\beta$ relate to various aspects of the propagation constant of the waveguide and references to k relate to various aspects of the free space propagation constant.

Figure 3:
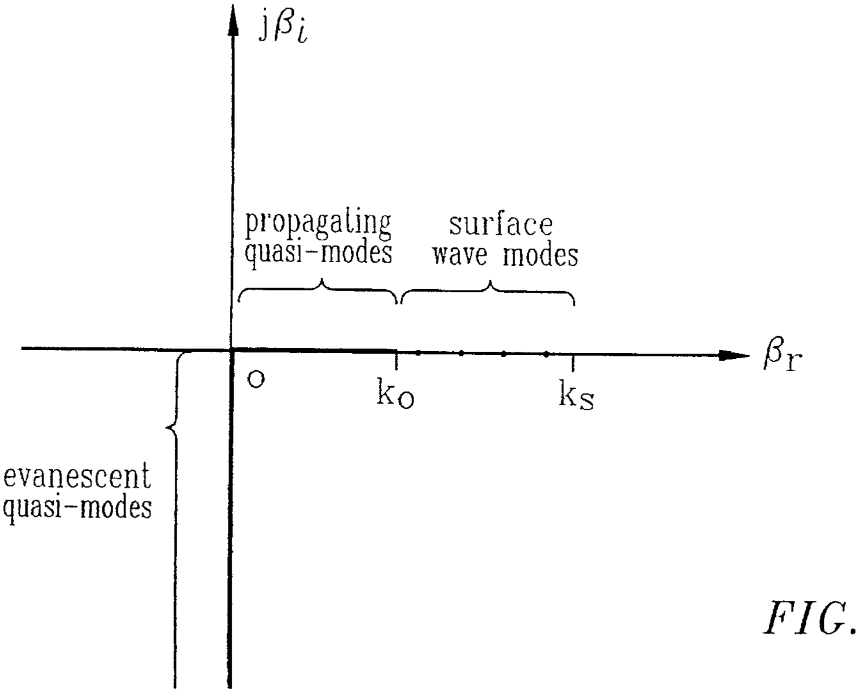
FIG. 3 is a graph representing the propagation constant $\beta$ of two dimensional slab-beam waveguide modes in the complex $\beta$-plane wherein the mode system consists of a discrete spectrum of surface wave modes and a continuous spectrum of radiative modes (quasi-modes)
Figure 4A:
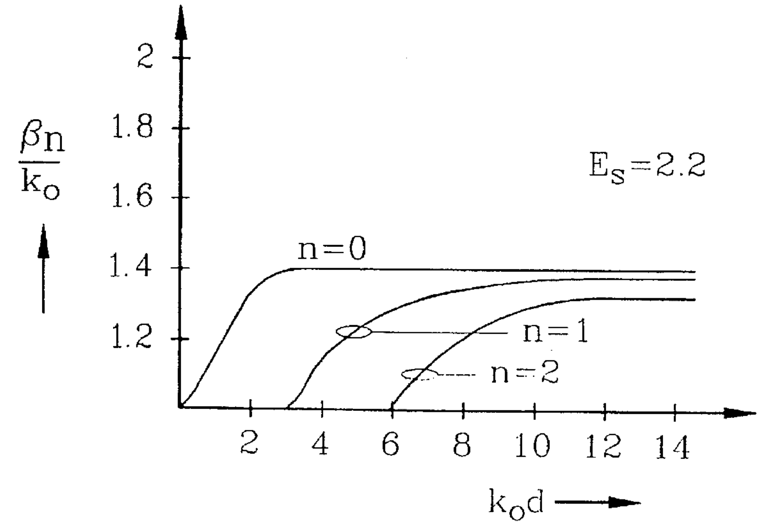
FIGS. 4*a*, 4*b*, and 4*c* are graphs of the normalized propagation constant $\beta_n/k_o$ of TM surface wave modes vs. electrical thickness $k_o d$ of slab-beam wave guides of various slab permittivities, $E_s$, which in 4*a* is equal to 2.2, in 4*b* is equal to 4, and in 4*c* is equal to 12.
Figure 4B:
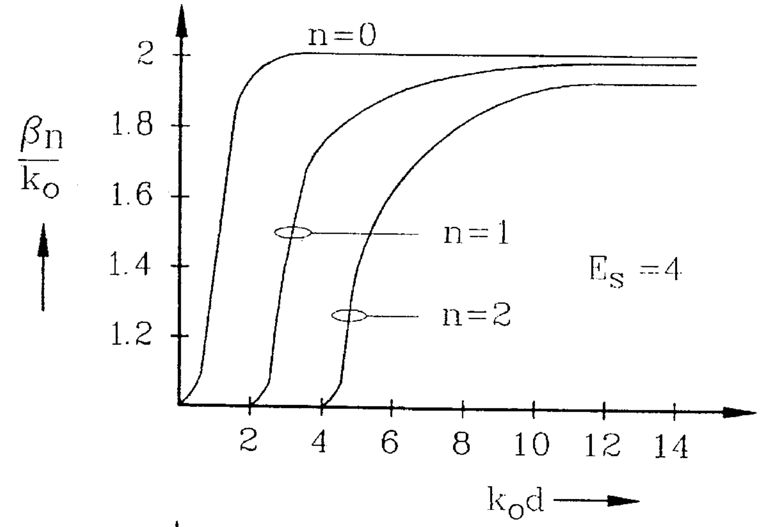
Figure 4C:
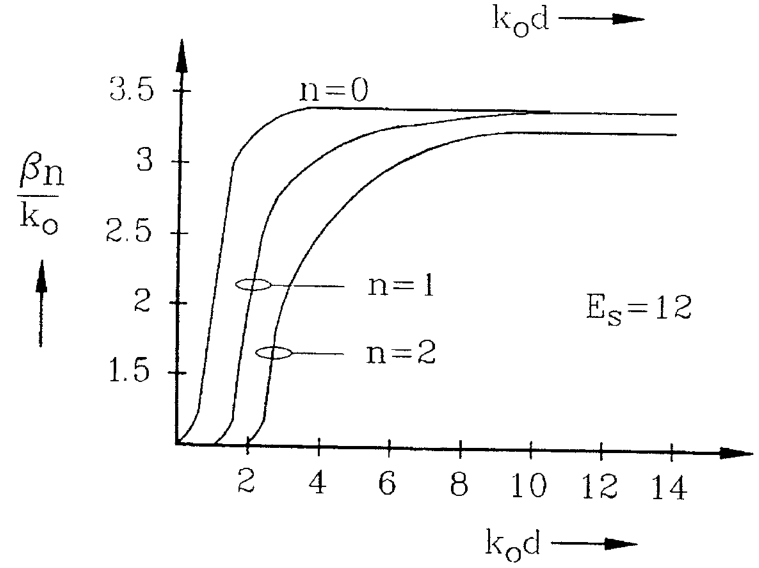
Figure 5A:
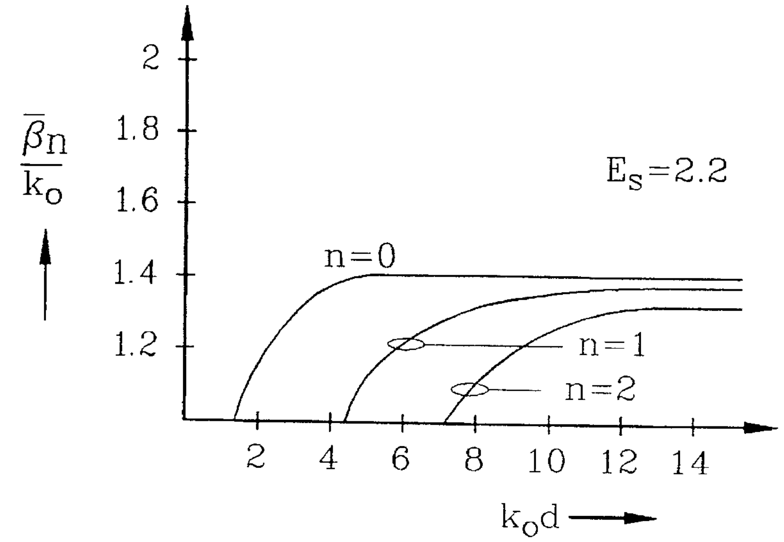
FIGS. 5*a*, 5*b*, and 5*c* are graphs of the normalized propagation constant $\bar{\beta}_n/k_o$ of TE surface wave modes vs. electrical thickness $k_o d$ of slab-beam wave guides of various slab permittivities, $E_s$, which in 5*a* is equal to 2.2, in 5*b* is equal to 4, and in 5*c* is equal to 12.
Figure 5B:
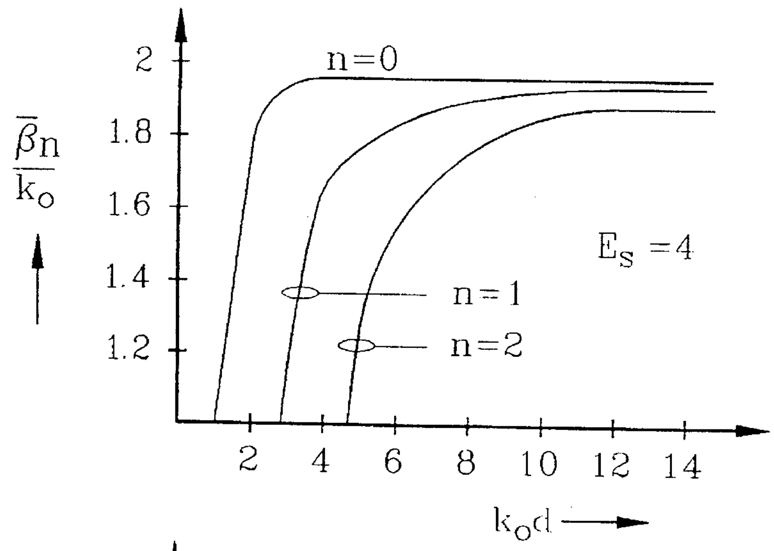
Figure 5C:
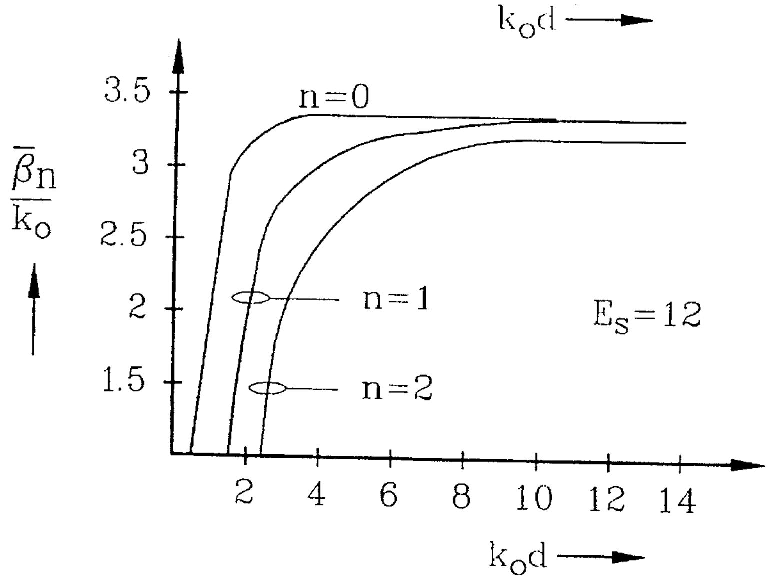

Solutions of the potentials $\Psi_n$ and $\Phi_n$ and their related functions yield the well known dispersion curves of the surface-wave modes of the slabguide. These are graphically represented in FIGS. 4*a–c* and 5*a–c* which show the respective propagation constants vs. $k_o d$ for typical slab permittivities, 2.2, 4, and 12. FIGS. 4*a*, 4*b*, and 4*c* are graphs of the normalized propagation constant $\beta_n k_o$ of TM surface wave modes vs. electrical thickness $k_o d$ of slab-beam wave guides of various slab permittivities, $E_s$, which in 4*a* is equal to 2.2, in 4*b* is equal to 4, and in 4*c* is equal to 12. FIGS. 5*a*, 5*b*, and 5*c* are graphs of the normalized propagation constant $\bar{\beta}_n k_o$ of TE surface wave modes vs. electrical thickness $k_o d$ of slab-beam wave guides of various slab permittivities, $E_s$, which in 5*a* is equal to 2.2, in 5*b* is equal to 4, and in 5*c* is equal to 12. The propagation constants of these modes are in the slow wave region as graphically depicted in FIG. 3 wherein $k_o<\beta_n,\bar{\beta}_n<k_S$ and the cut-off frequency of the $n^{th}$ surface wave mode is given by:

$$k_o d=\frac{n\pi}{\sqrt{\epsilon_s-1}}$$

$$k_o d=\frac{(n+1/2)\pi}{\sqrt{\epsilon_s-1}}$$

for TM and TE polarization respectively.

These equations show then that the total number of surface modes supported by a guide of a given permittivity and thickness is equal to the largest integer satisfying the conditions:

$$N < \frac{k_o d}{\pi} \sqrt{\epsilon_s - 1}$$

for TM polarization and $$\bar{N} < \frac{k_o d}{\pi} \sqrt{\epsilon_s - 1} - 1/2$$

for TE polarization. From this, the three-dimensional case, where the fields transmitted by the guide depend on the y-coordinate, may be generalized. The slabguide modes in the three-dimensional case are determined by separate calculations of the E- type field and H-type field, and since the guide structure is uniform in the y-direction, the y-dependence of these modes take the form $e^{jvy}$ with $-\infty < v + \infty$. The three-dimensional surface wave modes, therefore, take the form:

$$\Psi_n(x,y,z) = F_n(x) e^{j(vy - h_n z)} n = 0,1, \qquad N$$

$$\Phi_n(x,y,z) = G_n(x) e^{j(vy - \bar{h}_n z)} n = 0,1 \qquad \bar{N}$$

with $$h_n^2 = \beta_n^2 - v^2$$

and $$\bar{h}_n^2 = \bar{\beta}_n^2 - v^2$$

Note that the x-dependence of these modes is the same as in the two dimensional case. But, for sufficiently large v, the modes become evanescent in the z-direction. The three dimensional slabguide modes of the propagating type are obtained simply by allowing the corresponding two-dimensional modes to propagate in any direction within the y, z-plane, instead of confining them to propagation in the z-direction only. The relationship of the three-dimensional modes of the evanescent type to the two-dimensional modes has to be understood in terms of complex directions of propagation. With the equations set forth above, any field guided by the structure of FIG. 2 can be written as the sum of an E-type field and H-type Field.

Introducing the wavebeam concept as explained in the article mentioned above and neglecting higher order terms, the field derived from the electric potential reduces to a TM-wave with the significant components $E_x$, $E_z$, $H_y$. The field derived from the magnetic potential reduces to a TE-wave with the significant components $E_y$, $H_x$, $H_z$. These fields show the same TM and TE polarization as the corresponding two-dimensional (y-independent) fields. Although only one of the three "cross polarized" components of each field is identically zero, the wavebeam condition causes the two remaining components ($E_y$, $H_z$ of the E-field and $E_z$, $H_y$ of the H-field) to be small so that they can be neglected.

Similar to the theory of conventional beam waveguides, the TM and TE fields can then be expanded into Gauss-Hermite beam modes (denoted in the following by $Q_{nm}(y,z)$ and thus the total field can be written as a superposition of the partial fields:

$$E_x^{n,m} = \sqrt{\frac{\mu_0}{\epsilon_0}} \frac{k_0 \beta_n}{k^2} H_y^{n,m} = \left(\frac{k_0}{k^2}\right)^2 F_n(x) Q_{nm}(y,z) \cdot e^{-j\beta_n z}$$

$$E_z^{n,m} = \frac{1}{j\beta_n} \frac{\partial E_x^{n,m}}{\partial x}$$

wherein n=0,1 . . . N and m=0,1 . . . ∞ and $$E_y^{n,m} = \sqrt{\frac{\mu_0}{\epsilon_0}} \frac{k_0}{\bar{\beta}_n} H_x^{n,m} = G_n(x) \bar{Q}_{nm}(y,z) \cdot e^{-j\bar{\beta}_n z}$$

$$H_z^{n,m} = \frac{1}{j\bar{\beta}_n} \frac{\partial H_x^{n,m}}{\partial x}$$

wherein n=0,1 . . . N, and m=0,1 . . . ∞ and wherein $\beta_n$ relates to the propagation constants, $k_o$ relates to the free space propagation constant, N relates to the total number of surface wave modes supported by a guide of given permittivity and thickness, and $F_n$ and $G_n$ relate to well known functions of the propagation constants of waveguide and free space propagation constants. For any plane z=constant, the functions $Q_{nm}(y,z)$ form a complete system satisfying the orthogonality relation:

$$\int_{-\infty}^{\infty} Q_{nm}(y,z) Q_{nm'}(y,z) dy = 2\pi^{3/2} m! v_n \delta_{nm'}$$

The equations given above represent the partial fields in the space range $-z_t < z < +z_t$ of the guiding structure shown in FIG. 2. As those skilled in the art will appreciate from this specification and the teachings of the present invention: 1) the field distributions of these fields can be iterated with the period $2z_t$ by performing appropriate phase transformations in the planes $z = z_t$, $3z_t$, $5z_t$ . . . ; 2) the required phase transformations can be made the same for all partial fields by appropriately adjusting the mode parameters $v_n$ and $v'_n$. All of these fields, regardless of their mode numbers and polarizations, may then be iterated by one and the same guiding structure; and 3) the partial fields will satisfy orthogonality relations similar to the modes in conventional waveguides.

These fields as represented by the equations set forth above can thus be regarded as the modes of the dielectric slab-beam waveguide and, as in the case of conventional beam waveguides, may be called, "beam modes." Because the partial fields are conjugate complex in planes +z=const and −z=const, the field distribution in the plane $z = -z_t$ can be reconstituted in the plane $z = +z_t$ by performing an appropriate phase transformation in this plane. The field distribution in the $-z_t < z < +z_t$ is then repeated in the range $+z_t < z, +3z_t$. By iterating this process, i.e., by performing identical phase transformations in the planes $z = 3z_t$, $5z_t$ . . . the field distribution of the partial field is repeated periodically with the spacing $2z_t$ of the phase transformers. The required phase transformation $\Delta\phi$ is then expressed as follows:

$$\Delta\phi = \Delta\phi_n(y) = \frac{\frac{v_n^4}{\beta_n} z_t}{1 + \left(\frac{v_n^2}{\beta_n} z_t\right)^2} y^2$$

This equation is quadratic in y and therefore, according to the present invention the phase transformation can be realized by a cylindrical lens of such a quadratic nature. Identical lenses then would be inserted into the slab-beam waveguide at intervals of $2z_t$. A lens according to the present invention then would yield a phase transformation as expressed as the following:

$$\Delta\phi = -\hat{\phi}_n + \frac{1}{2}\ \frac{\beta_n}{2f}\ y^2$$

wherein the lens takes its form from the first phase transformation equation given above, if the focal length of the lens, f, is chosen to be:

$$f = \frac{z_t}{2}\left[1 + \left(\frac{\beta_n}{v_n^2}\ \frac{1}{z_t}\right)^2\right]$$

wherein $\hat{\phi}_n$, on the right side of the previous equation, is a constant which depends on the shape of the lens. For the convex lens shown in FIG. 1(*a*) this constant takes the form of:

$$\hat{\phi}_n = \left(\frac{\beta_n}{2f}\right) y_0^2$$

where $2y_0$ is the lateral width (aperture) of the lenses. For the concave lenses shown in FIG. 1 (*b*), $\hat{\phi}_n$ is zero if the lens thickness is very small at the center.

As those skilled in the art will realize, with each iteration, the partial fields are multiplied by a constant phase factor $\Gamma_{nm}$ which also includes the phase shift constant of the lenses. An important factor to note, however, is that the focal length is independent of the mode number m and, in addition, becomes independent of the mode number n and the polarization CYE or TM) of the partial fields if:

$$\frac{v_n^2}{\beta_n} = \frac{\bar{v}_n^2}{\bar{\beta}_n} = const. \neq f(n)$$

In other words, with this condition, all partial fields of arbitrary orders, n, m and both polarizations are iterated by one and the same sequence of phase transformers. Conversely, a dielectric slab-beam waveguide with a given set of lenses of focal length f and spacing $2z_t$ will iterate all partial fields provided their mode parameters are chosen according to the relations:

$$v_n^2 = \frac{\beta_n}{\sqrt{z_t(2f - z_t)}}$$

$$\bar{v}_n^2 = \frac{\bar{\beta}_n}{\sqrt{z_t(2f - z_t)}}$$

Note that the propagation constants are determined by the thickness d and permittivity $\epsilon_s$ of the dielectric slab, and that the focal length f must exceed $z_t/2$ to have real solutions, i.e., for iteration to occur.

Further, as those skilled in the art will realize, the beam modes described above as the total field, which was described as the superposition of the partial fields, satisfy orthogonality relations. These partial fields are, of course, mutually orthogonal between TM versus TE-modes since (in the approximation used here) they do not have common transverse components. Further, with the orthogonality relations, any field guided by the dielectric slab-beam waveguide, can be expanded into the beammodes of this guide. The expansion is complete provided that the field satisfies the wavebeam condition with regard to its y-dependence and, concerning its x-dependence, behaves as a surface wave field of the dielectric slab.

While the field distribution of each beammode is strictly periodic with the spacing of the phase transformers, this does not necessarily apply for a composite wavebeam consisting of several beammodes. With each iteration, the beammodes are multiplied by the phase factors $\Gamma_{n,m}$, which depend of the mode numbers n and m. Therefore, the complex amplitude spectrum of the wavebeam will vary from section to section of the guide. The total power of this wavebeam, however, is preserved since the beammodes are power wise orthogonal and the absolute value of each $\Gamma_{nm}$, is unity. This holds true for the idealized dielectric slab-beam waveguide considered in FIG. 2 having lossless phase transformers and infinite dimensions in the x- and y-directions. The iteration losses that occur in guides of finite cross section will be addressed later in the specification.

Since the beammodes addressed above have a constant beamwidth in the x-direction, but their beamwidth in the y-direction varies periodically with z, the beam width has a minimum halfway between the phase transformers and a maximum at the location of the lenses. Accordingly, the 1/e-beamwidth at these positions may best be described by the following equations:

$$\Delta w_{min} = \frac{2}{v_n} = 2\left(\frac{z_t}{\beta_n}\right)^{\frac{1}{2}}\left(\frac{2f}{z_t} - 1\right)^{\frac{1}{4}}$$

and $$\Delta w_{max} = \frac{2}{v_n}\left[1 + \left(v_N^2\frac{z_t}{\beta_n}\right)^2\right]^{\frac{1}{2}} = 2\left(\frac{z_t}{\beta_n}\right)^{\frac{1}{2}}\left[\frac{z_t}{2f}\left(1 - \frac{z_t}{2f}\right)\right]^{-\frac{1}{4}}$$

These equations apply to the fundamental Gaussian mode of the TM polarization. The corresponding formulas for TE polarization are obtained by replacing the analog of $v_n$ and $\beta_n$. For higher order Gauss-Hermite modes, the beamwidth will be somewhat larger. For given lens spacing $2z_t$, optimum beam confinement near the z-axis is achieved when the focal length f of the lenses is chosen such that $\Delta w_{max}$ is as small as possible, which will occur for $f \approx z_t$, i.e., in the "confocal" case wherein the focal points of adjacent lenses coincide.

A useful measure for the lateral extent of the beammodes in the x-direction is the fraction $\eta_n$ of the total power of these modes that is transmitted in the air region outside the dielectric slab. This fraction may be calculated from the following:

$$\eta_n = \frac{\int_d^\infty F_n^2(x)dx}{\int_0^\infty \left(\frac{k_o}{k}\right)^2 F_n^2(x)dx} = \frac{\epsilon_s}{\epsilon_s - 1} \cdot \frac{\epsilon_s - \left(\frac{\beta_n}{k_o}\right)^2}{k_o d\left[\left(\frac{\beta_n}{k_o}\right)^2 - 1\right]^{\frac{1}{2}}\left[\left(\frac{\beta_n}{k_o}\right)^2(\epsilon_s + 1) - \epsilon_s\right] + \epsilon_s}$$

for TM modes and $$\eta_n = \frac{\int_d^{\infty} G_n^2(x)dx}{\int_0^{\infty} G_n^2(x)dx} = \frac{1}{\epsilon_s - 1} \cdot \frac{\epsilon_s - \left(\frac{\bar{\beta}_n}{k_o}\right)^2}{k_o d \left[\left(\frac{\bar{\beta}_n}{k_o}\right)^2 - 1\right]^{\frac{1}{2}} + 1}$$

for TE modes.

Figure 6A:
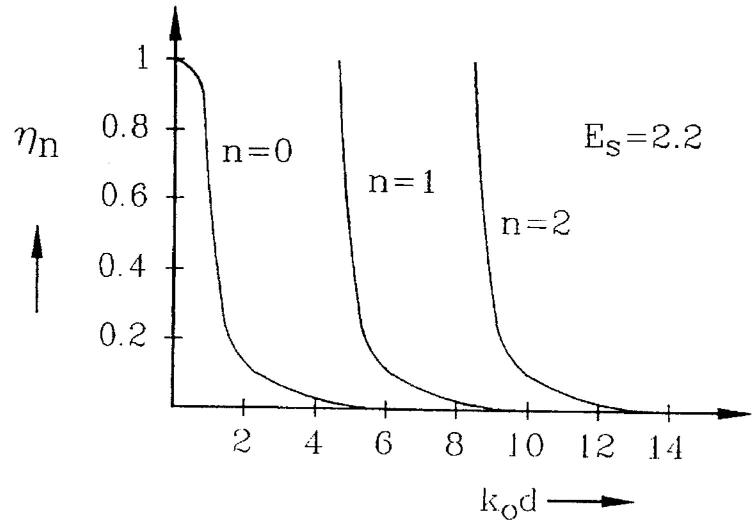
FIGS. 6*a*, 6*b*, and 6*c* are graphs of the fraction of power $\eta$ of TM polarized surface wave modes transmitted outside a dielectric slab wherein $\eta$ is plotted vs. $k_o d$ and wherein the slab-beam wave guides have various slab permittivities, $E_s$, which in 6*a* is equal to 2.2, in 6*b* is equal to 4, and in 6*c* is equal to 12.
Figure 6B:
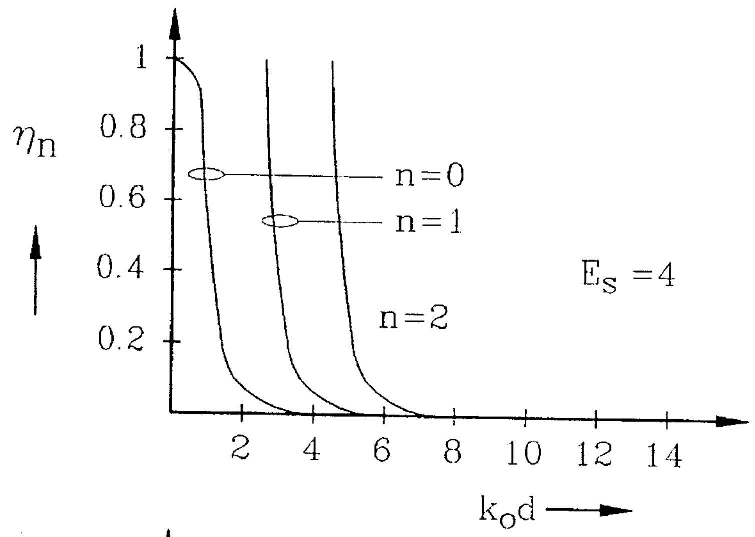
Figure 6C:
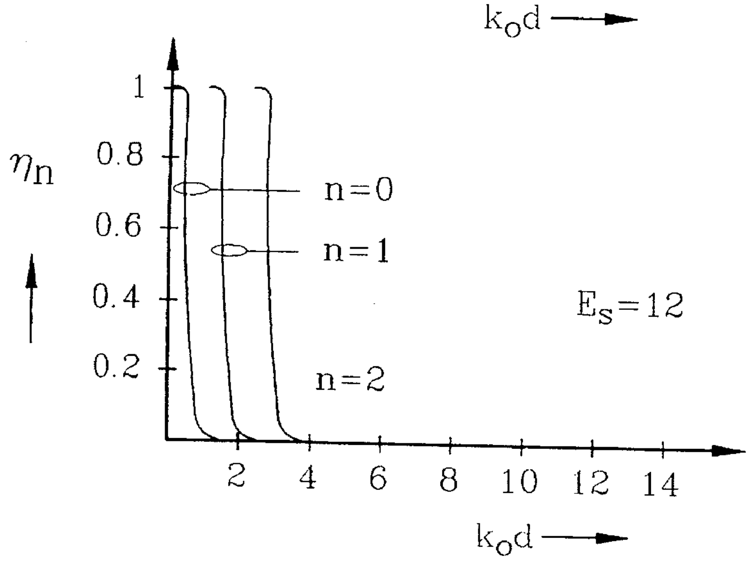
Figure 7A:
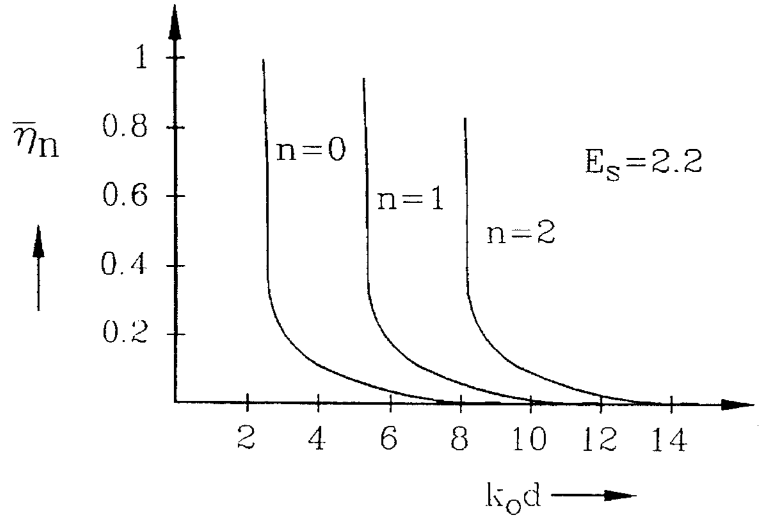
FIGS. 7*a*, 7*b*, and 7*c* are graphs of the fraction of power $\bar{\eta}$ of TE polarized surface wave modes transmitted outside a dielectric slab wherein $\bar{\beta}$ is plotted vs. $k_o d$ and wherein the slab-beam wave guides have various slab permittivities, $E_s$, which in 7*a* is equal to 2.2, in 7*b* is equal to 4, and in 7*c* is equal to 12.
Figure 7B:
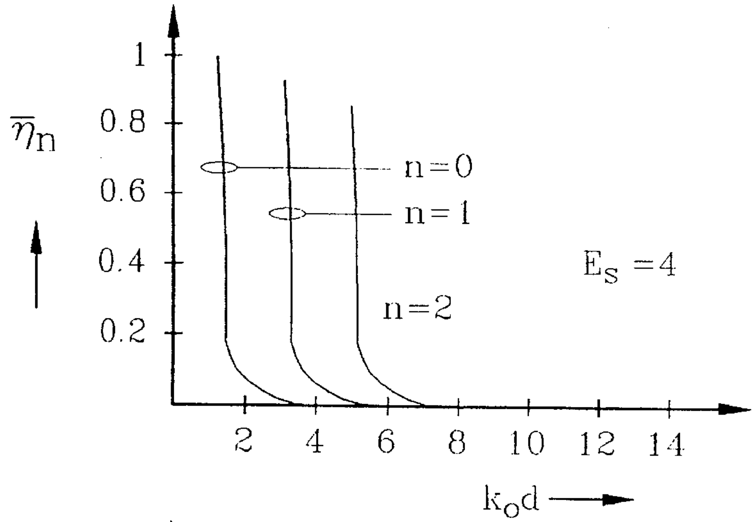
Figure 7C:
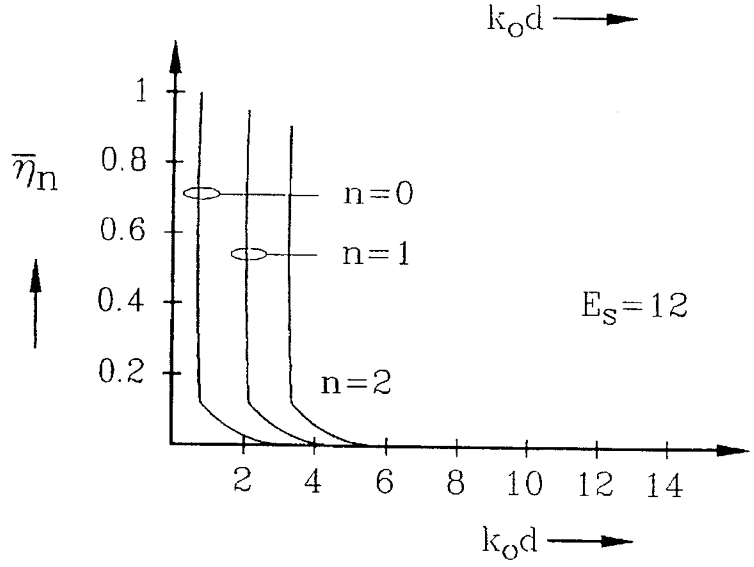

FIGS. 6a, 6b, and 6c are graphs of the fraction of power $\eta$ of TM polarized beammodes transmitted outside a dielectric slab wherein $\eta$ vs. $k_o d$ and wherein the slab-beam wave guides have various slab permittivities, $E_s$, which in 6a is equal to 2.2, in 6b is equal to 4, and in 6c is equal to 12. FIGS. 7a, 7b, and 7c are graphs of the fraction of power $\bar{\eta}$ of TE polarized beammodes transmitted outside a dielectric slab wherein $\bar{\eta}$ vs. $k_o d$ and wherein the slab-beam wave guides have various slab permittivities, $E_s$, which in 7a is equal to 2.2, in 7b is equal to 4, and in 7c is equal to 12. Away from cut-off, power in the air region is small, in particular for large $E_s$, and most of the energy of the beammodes is transported inside the dielectric. Accordingly, to avoid overmoding, it may be desirable to chose the slab thickness d sufficiently small so that the guide supports only the n=0 group of Gauss-Hermite beam modes. This condition on d is expressed as:

$$0 < k_o d < \frac{\pi}{\sqrt{\epsilon_s - 1}}$$

and $$\frac{1}{2}\ \frac{\pi}{\sqrt{\epsilon_s - 1}} < k_o d < \frac{3}{2}\ \frac{\pi}{\sqrt{\epsilon_s - 1}}$$

for TM and TE modes respectively. The upper limits are given by the appearance of the n=1 group of the beammodes. Near this upper limit, the percentage of the power of the n=0 beammodes transmitted outside the slab is small, i.e. for $E_s$=2.2, $\eta_o$=0.028 and $\bar{\eta}_o$ =0.061; for $E_s$ =4.0, $\eta_o$=0.018 and $\bar{\eta}_o$=0.060; for $E_s$=12.0, $\eta_o$ =0.0085 and $\bar{\eta}_o$=0.059.

With the present invention, such a dielectric slab-beam waveguide is particularly well suited for the design of planar quasi-optical circuits. The characteristics of the beammodes of the present invention may be summarized as follows:

1) In the direction normal to the slab surface (x-direction) the beammodes behave as surface waves guided by the slab and their magnitude will decrease exponentially away from the slab and their energy will be largely confined to the interior of the slab.

2) In the lateral direction (y-direction) the beammodes will behave as reiterative wavebeams of the Gauss-Hermite type which are guided by the sequence of equally spaced identical phase transformers that are inserted in the slab and periodically reset the cross-sectional phase distribution of the beammodes.

3) The propagation constant of the beammodes in the longitudinal direction (z-direction) will always stay within the range $k_o<\beta_n$, $\bar{\beta}_n<k_s$, thus characterizing the beammodes as surface waves guided by the dielectric slab.

4) The beammodes will form a system of orthogonal modes that will allow the complete description of any wavebeam guided by the dielectric slab-beam waveguide.

5) While conventional beam waveguides are virtually nondispersive if $z_t$, $f>>\lambda_o$, the beammodes of the dielectric slab-beam waveguide will show the dispersion of the dielectric slab guide.

The phase velocity and group velocity of the beammodes can be derived from the equations given above for the propagation constants and $\Gamma_{nm}$. Disregarding dispersion effects caused by the phase transformers (which should be small for thin lenses), the phase velocity and group velocity can be calculated as follows:

$$v_p \approx \frac{\omega}{\beta_n - \frac{m+1/2}{\sqrt{z_t(2f-z_t)}}} \approx \frac{\omega}{\beta_n} = \frac{c_o}{\sqrt{\epsilon_{eff}}}$$

$$v_g \approx \frac{\beta_n}{\omega}\ \frac{c_0^2}{\epsilon_s(1-\eta_n)+\eta_n} = \frac{c_o}{\sqrt{\epsilon_{eff}}}\ \frac{\epsilon_{eff}}{\epsilon_{avg}}$$

where $c_o$ is the free space wave velocity, $\epsilon_{eff}$ is defined in the usual manner as $(\beta_n/k_o)^2$, and the "average" dielectric constant of the guide is $\epsilon_{avg}=\epsilon_g(1-\eta_n)+\eta_n$ and is obtained by weighting the permittivities of the dielectric slab and the air region with the relative powers transmitted in these regions.

From the above listed characteristics, those skilled in the art will now recognize that if in the present slab-beam waveguide a single mode is launched on the guide, it will suffer little degradation due to mode conversion as it travels down the guide even if there is a deviation in the physical guide width. Hence, there is no need for maintaining a constant width at tight tolerances when fabricating the device. In addition, bends and transitions are easily implemented in this guide in standard quasi-optical technology while causing minimum radiation loss and mode conversion. Further, the guide sections operated as open resonators should be well suited for the design of quasi-optical power combiners that could serve as single mode power sources for these guides.

Figure 1B:
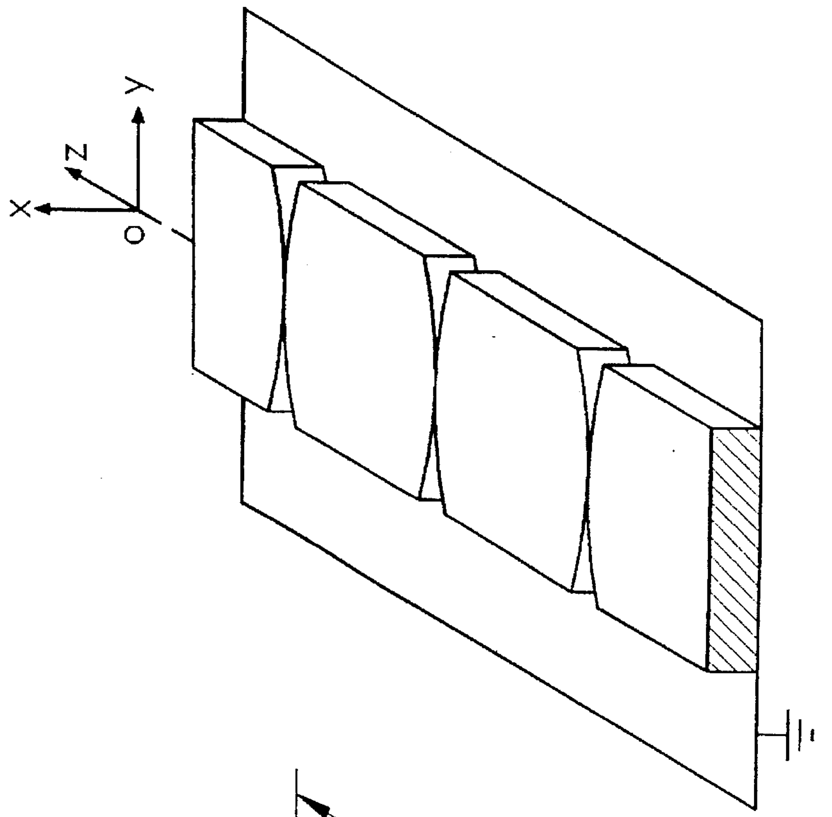
Figure 1A:
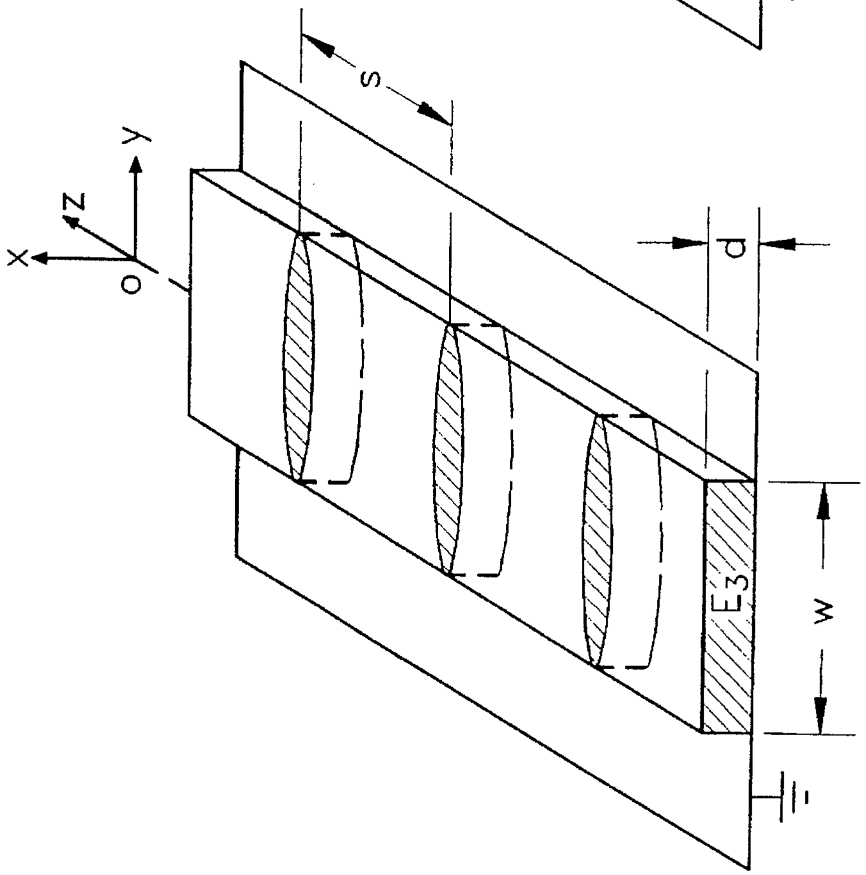

Specifically and now referring to FIGS. 1a and 1b, the present invention includes a thin grounded dielectric slab of rectangular cross-section into which a sequence of equally spaced cylindrical lenses are fabricated. The axis of these lenses coincides with the center line of the slab guide, i.e. the propagation direction of the guide. The spacing of the lenses s is assumed to be in the order of many guide wavelengths $\lambda$; the width of the slabguide w is in the order of at least several $\lambda$; and the thickness d of the guide typically should be sufficiently small so that only the fundamental surface wave mode can exist on the slab. The equations governing these dimensions have been stated above in considering the idealized waveguide in FIG. 2.

The lenses will have a convex shape if the permittivity of the lenses exceeds that of the guide. This is represented in FIG. 1a wherein the lenses constitute a material which has a higher permittivity than $E_3$ and is inserted in the slab-beam waveguide at predetermined intervals. If the permittivity of the lenses is less than that of the waveguide, the lenses will have a concave shape. This is represented in FIG. 1b as sections of the waveguide being removed. As those skilled in the art will appreciate, the concave shape will simplify fabricating the guide and will reduce its diffraction losses because air is being used as the lens dielectric material and these is no gap in the dielectric slab near the center line where the field strength of the fundamental beam mode is largest. (This lens configuration and the effect of signal propagation through air was addressed above.)

The structure uses two distinct waveguiding principles in conjunction with each other to confine and guide electromagnetic waves. In the x-direction, the field distribution of a guided wave is that of a surface-wave mode of the slabguide; the wave is guided by total reflection at the dielectric-to-air interface and its energy is transmitted primarily within the dielectric. In the y-direction, the field distribution is that of a Gaussian beam-mode which is guided by the lenses through periodic reconstitution of the cross-sectional phase distribution, resulting in an "iterative wavebeam" whose period is the spacing of the lenses. The guided modes are, in effect, TE- or TM-polarized with respect to the z-direction, the propagation of the guide.

Figure 8A:
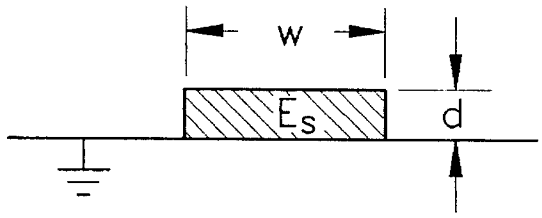
FIGS. 8*a*, 8*b*, and 8*c* represent cross-sectional views of the various embodiments of the present invention to suppress reflection at the sidewalls of the dielectric slab wherein 8*a* represents the conventional slab, 8*b* represents the use of an absorbing material, and 8*c* represents the use of slanted sidewalls instead of vertical ones.
Figure 8B:
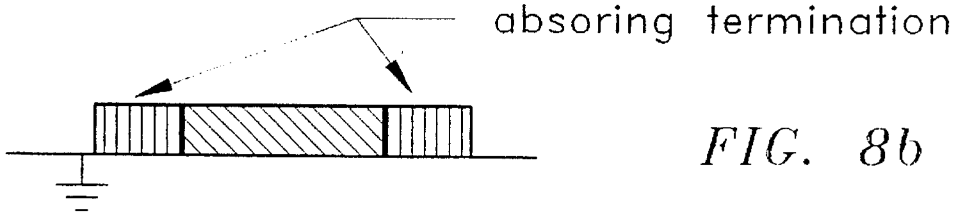
Figure 8C:
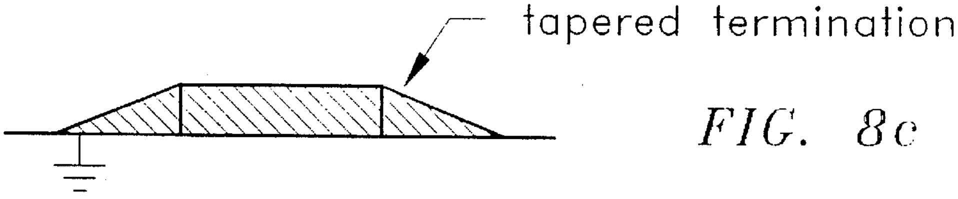

Of course, because the present invention must be of a finite size, a "spill over" effect occurs. This "spill over" effect is caused by energy, which after passing a given lens by-passes the following lens, being radiated away from the guide. In the case of the dielectric slab-beam waveguide, this spill over energy (more precisely, the part of the energy caused by the finite y-dimension of the lenses and travelling within the dielectric slab), will be reflected at the side walls of the slab and bounce back and forth between these walls, with little attenuation. In particular, this will occur when the permittivity of the slab is high and its thickness is sufficiently far above the cut-off. Accordingly, to minimize field distortions, the reflection coefficient of the sidewalls must be controlled, for example by covering the walls with absorbing material or by replacing vertical walls with tapered transitions, as indicated in FIGS. 8*b* and 8*c*, respectively. The associated iteration loss can be minimized by choosing the width w of the slab sufficiently large, e.g. $w>3\Delta w_{max}$.

A second problem derives from the limited height of the lenses in the x-direction. For ease of fabrication, the lenses should not extend beyond the upper surface of the dielectric slab, and in an actual guide, the phase transformation will be performed only within the dielectric slab but not in the air region above it. Since part of the power of the beammodes is transmitted in the air region, this truncation of the phase correction will lead to scattering, resulting in an increased iteration loss, and mode conversion, possibly causing field distortions.

An estimate of these effects is derived in an the Appendix of the article mentioned previously which was authored by the inventors and entitled, *Hybrid Dielectric Slab-Beam Waveguide for the Sub-Millimeter Wave Region.* Briefly though, the derivation stems from an assumed fundamental Gaussian beammode being incident upon the phase transformer in the plane $z=z_t$. This beam mode determines the field distribution in the input plane of the device. The field distribution in the output plane is obtained by applying the phase transformation in the region $0<x<d$, i.e. within the dielectric slab with no phase correction in the air region $d<x<\infty$.

Using the orthogonality relations described above, the field distribution in the output plane is expanded into the beammode spectrum of the guide section $z_t<z<3z_t$. The power $P_o$ of the fundamental Gaussian beammode will be smaller than that of the incident beammode, and is a measure for the iteration loss. The powers $P_m$ in higher-order Gauss-Hermite beammodes indicate the magnitude of the mode conversion effect. The power $P_s$ scattered by the truncated phase transformer is found by invoking energy conservation, i.e., by subtracting the power of the combined beammode spectrum of the guide section $z_t<z<3z_t$ from the power of the incident beammode (see discussion in the Appendix).

For a conformal guide with $f=z_t$ one obtains:

$$\frac{P_0}{P_{inc}} = 1 - 0.45\eta_0 + 0.15\eta_0^2$$

-continued $$\sum_{m=2,4\ldots}^{\infty} \frac{P_m}{P_{inc}} = 0.30\eta_0^2$$

$$\frac{P_s}{P_{inc}} = 1 - \sum_{m=0}^{\infty} \frac{P_m}{Pinc} = 0.45\eta_0(1-\eta_0)$$

where $P_{inc}$ is the power of the incident Gaussian beammode and $\eta_0$ is given above. The formulas hold for both TM- and TE-polarization.

The equations given directly above indicate that roughly one half of the power transmitted outside the dielectric slab is lost with each iteration. Most of this power is scattered away from the guide and the power that is transformed into higher order beammodes becomes proportional to $\eta^2{}_0$ which is smaller in higher orders. Hence little mode conversion will occur when $\eta_0$ is small, i.e. when the electrical thickness of the slab, $k_o d$, is sufficiently far above cut-off. In this region of small $\eta_0$, the iteration loss is expected to be in the order of a few percent, depending on the guide permittivity, while field distortions will be minimal.

The total iteration loss of an actual dielectric slab-beam waveguide, of course, consists of several parts including dielectric losses in the slab material; reflection and absorption losses of the lenses; and diffraction losses due to the finite size of the lenses both in the x- and y-directions. All of these losses can be made small, by appropriate design of the guide, except for the loss associated with the finite height of the lenses, which is inherent with the guide configuration.

It is to be understood that other features are unique and that various modifications are contemplated and may obviously be resorted to by those skilled in the art.. Therefore, within the scope of the appended claims, the invention may be practiced otherwise than as specifically described.

What is claimed is:

1. A hybrid dielectric slab-beam waveguide comprising:

a slab of dielectric material, the slab having a predetermined width and height and having a first permittivity and dielectric constant of predetermined value;

a plurality of lenses inserted in the slab at predetermined intervals, each lens having a second permittivity and having a predetermined shape defined by a quadratic function;

the slab-beam waveguide being formed such that a field distribution of a guided wave in an x-direction has a surface wave mode, wherein the x-direction is defined as a direction parallel to the height of the slab of dielectric material, and such that a field distribution of the guided wave in a y-direction has a Gaussian beammode which is guided by the lenses through periodic reconstruction of a cross-sectional phase distribution, wherein the y-direction is defined as a direction parallel to the width of the slab of the dielectric material.

2. The waveguide of claim 1 wherein each lens is convex in shape and the permittivity of the lenses is greater that the permittivity of the slab.

3. The waveguide of claim 2 wherein a central axis of each of the lenses coincides with a center line of the slab.

4. The waveguide of claim 3 wherein the lenses are spaced from one another at a predetermined interval.

5. The waveguide of claim 4 wherein the predetermined interval is $2Z_t$, where $Z_t$ is a constant.

6. The waveguide of claim 5 wherein the width of the slab is at least three waveguide wavelengths.

7. The waveguide of claim 6 wherein the thickness of the slab is sufficiently small so that only the fundamental surface wave mode can exist on the slab.

8. The waveguide of claim 7 wherein the slab has a rectangular cross-section.

9. The waveguide of claim 8 wherein sides of the slab are tapered.

10. The waveguide of claim 1 wherein each lens is concave in shape and the permittivity of the lenses is less than the permittivity of the slab.

11. The waveguide of claim 10 wherein a central axis of each of the lenses coincides with a center line of the slab.

12. The waveguide of claim 11 wherein the lenses are spaced from one another at a predetermined interval.

13. The waveguide of claim 12 wherein the predetermined interval is $2Z_t$, where $Z_t$ is a constant.

14. The waveguide of claim 13 wherein the width of the slab is at least three waveguide wavelengths.

15. The waveguide of claim 14 wherein the thickness of the slab is sufficiently small so that only the fundamental surface wave mode can exist on the slab.

16. The waveguide of claim 15 wherein the slab has a rectangular cross-section.

17. The waveguide of claim 16 wherein sides of the slab are tapered.

18. A hybrid dielectric slab-beam waveguide comprising:

a slab of dielectric material, the slab having a predetermined width and height and having a first permittivity and dielectric constant of predetermined value, wherein the width of the slab is at least three times a wavelength of a propagating signal, wherein the slab has a rectangular cross-section, and wherein the thickness of the slab is sufficiently small so that only the fundamental surface wave mode can exist on the slab;

a plurality of lenses inserted in the slab at predetermined intervals, each lens having a second permittivity and having a predetermined shape defined by a quadratic function, wherein each lens is convex in shape and the permittivity of the lenses is greater that the permittivity of the slab, wherein a central axis of each of the lenses coincides with a center line of the slab, and wherein the lenses are spaced from one another at an interval of $2z_t$, where $Z_t$ is a constant; and energy absorbing material is displaced along sides of the slab.

19. A hybrid dielectric slab-beam waveguide comprising:

a slab of dielectric material, the slab having a predetermined width and height and having a first permittivity and dielectric constant of predetermined value, wherein the width of the slab is at least three waveguide wavelengths, wherein the slab has a rectangular cross-section, and wherein the thickness of the slab is sufficiently small so that only the fundamental surface wave mode can exist on the slab;

a plurality of lenses inserted in the slab at predetermined intervals, each lens having a second permittivity and having a predetermined shape defined by a quadratic function, wherein each lens is concave in shape and the permittivity of the lenses is less that the permittivity of the slab, wherein a central axis of each of the lenses coincides with a center line of the slab, and wherein the lenses are spaced from one another at an interval of $2z_t$, where $Z_t$ is a constant; and energy absorbing material is displaced along sides of the slab.

20. A hybrid dielectric slab-beam waveguide comprising:

a slab of dielectric material, the slab having a predetermined width and height and having a first permittivity and dielectric constant of predetermined value;

a plurality of lenses inserted in the slab at predetermined intervals, each lens having a second permittivity and having a predetermined shape defined by a quadratic function wherein a phase transformation provided by each lens is given by:

$$\Delta\phi = -\hat{\phi}_n + \frac{1}{2}\ \frac{\beta_n}{2f}\ y^2$$

wherein the focal length f of the lens is chosen to be:

$$f = \frac{z_t}{2}\left[1 + \left(\frac{\beta_n}{v_{2_n}}\ \frac{1}{z_t}\right)^2\right]$$

and wherein $\phi_n$ is a constant which depends on the shape of the lens, $v_n$ represents the mode parameters of the signal, where $Z_t$ is a constant, y is the width of the slab of dielectric material, and $\beta_n$ is the propagation constant of the waveguide.

21. The waveguide of claim 20 wherein the thickness of the slab is defined by the following:

$$0 < k_o d < \frac{\pi}{\sqrt{\epsilon_s - 1}}$$

and $$\frac{1}{2}\ \frac{\pi}{\sqrt{\epsilon_s - 1}} < k_o d < \frac{3}{2}\ \frac{\pi}{\sqrt{\epsilon_s - 1}}$$

for TM and TE modes respectively, wherein $k_o$ is the propagation constant of free space, d is the thickness of the slab and $\epsilon_s$ is the permittivity of the slab.

* * * * *